United States Patent [19]
Babbitt, Jr. et al.

[11] 3,841,430
[45] Oct. 15, 1974

[54] ROLL STRUCTURE CAB AND SEAT ARRANGEMENT FOR TRACK-TYPE TRACTORS

[75] Inventors: John H. Babbitt, Jr.; Ronald G. Boyer, both of Peoria; Arthur E. Olt, Jr., Pekin; Paul E. Schuck, Canton; Sheldon L. Stark, Eureka, all of Ill.

[73] Assignee: Caterpillar Tractor Co., Peoria, Ill.

[22] Filed: Oct. 2, 1972

[21] Appl. No.: 294,232

[52] U.S. Cl............. 180/89 A, 296/28 C, 296/102
[51] Int. Cl............................................ B62d 33/06
[58] Field of Search.............. 180/89 A; 280/150 C; 296/102, 28 C

[56] References Cited
UNITED STATES PATENTS

| | | | |
|---|---|---|---|
| 1,689,765 | 10/1928 | Baxter | 296/28 C |
| 3,088,537 | 5/1963 | Tourneau | 180/89 R |
| 3,191,712 | 6/1965 | Dodge | 180/89 R |
| 3,578,098 | 5/1971 | Clancy | 180/89 R |
| 3,578,377 | 5/1971 | Babbitt | 296/102 |

Primary Examiner—Robert R. Song
Attorney, Agent, or Firm—Phillips, Moore, Weissenberger, Lempio & Strabala

[57] ABSTRACT

There is disclosed a tiltable roll protective frame and cab arrangement for tractors and other earthworking and similar vehicles. The arrangement provides a structural frame extending over the operator station of a tractor to protect the operator in case the vehicle should roll over. The protective frame structure includes structural members which also function to support the seat. The arrangement is also constructed so that the seat structure and floor platform serve to enclose the area over controls and other machinery below the operator station. With this arrangement, tilting of the roll structure and cab provides easy access for repair and maintenance of the elements and control means below the operator station. Enclosure panels are provided which are suspended from the roof of the protective frame to provide an enclosure for environmental protection of the vehicle operator.

9 Claims, 4 Drawing Figures

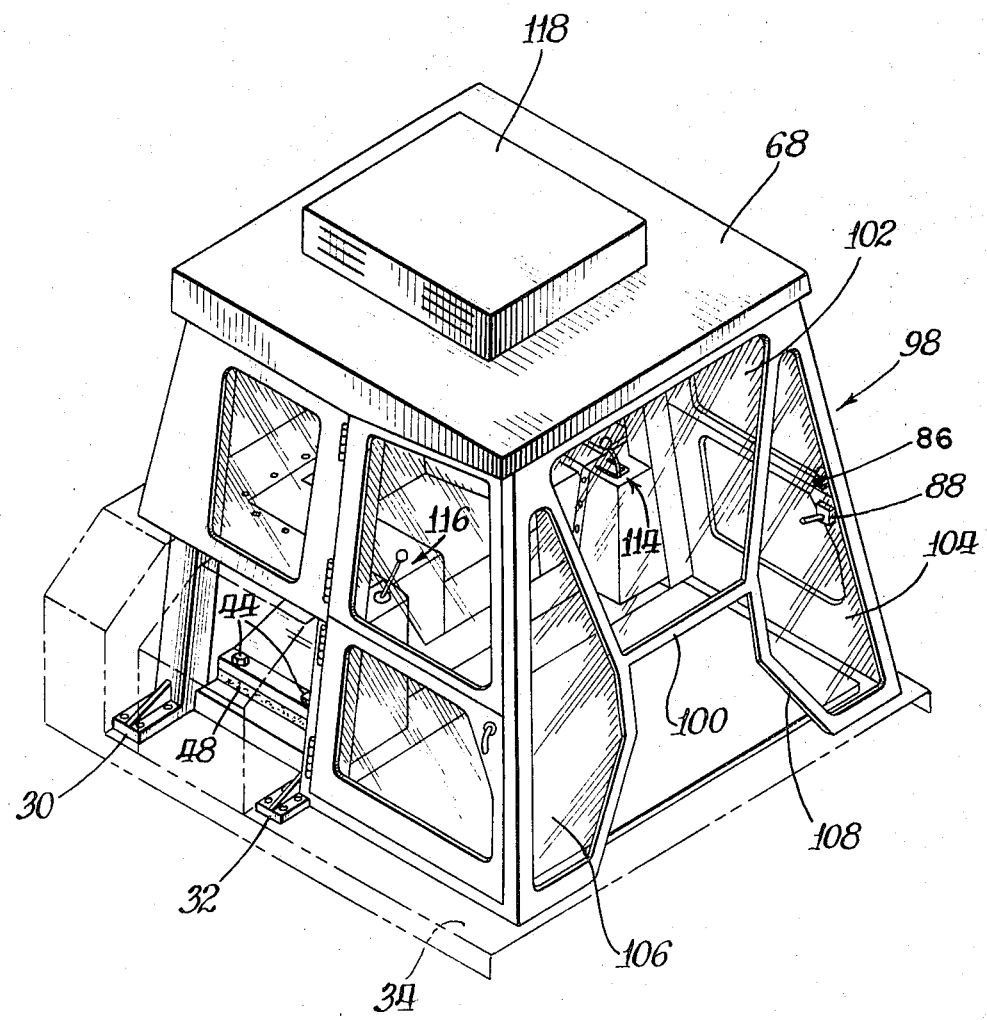

ROLL STRUCTURE CAB AND SEAT ARRANGEMENT FOR TRACK-TYPE TRACTORS

BACKGROUND OF THE INVENTION

The present invention is directed to roll-over protective frame and cab or enclosure structure for tractors and other construction equipment.

Roll protective frames for tractors and other off-the-road vehicles are well known. Such prior known structures, however, present a number of problems. Among these problems is the fact that these structures interfere with access to certain areas for repair and maintenance of the vehicle. Such structures must be inherently strong and rigid and thus must be rigidly attached to structural members of the tractor. Such arrangements not only interfere with access to components of the vehicle for maintenance and repair, but also interfere with the use of enclosure structures to provide environmental protection to the operator.

The prior art is exemplified by U.S. Pat. No. 3,578,098, issued to Lawrence F. Clancy, and U.S. Pat. Nos. 3,578,377 and 3,632,134, both issued to John H. Babbitt, Jr., et al., and all assigned to the assignee of the present invention. These patents, while serving to solve the problems to which they are directed, fail to solve the above-discussed problems. U.S. Pat. No. 3,578,377, for example, provides an effective roll protective frame; however, the roll protective frame is not compatible with enclosure structure for the operator compartment. The frame of this patent also is tiltable to provide access to control components; however, this is further complicated by the fact that the console also tilts with the platform and protective structure. Such tilting of the console requires that the control system linkages be disconnected from the control elements on the console as it is being tilted or prior to its being tilted.

SUMMARY AND OBJECTS OF THE INVENTION

It is a primary object of the present invention to provide a roll protective structure for tractors and the like that is rugged and effective, and provides easy access to control systems of the vehicle.

Another object of the present invention is to provide a combined roll structure and operator platform that is tiltable to provide access to control elements and components enclosed or covered by the platform, and yet provides insulation of the operator platform from atmospheric contaminants from the vehicle engine area.

A further object of the present invention is to provide a vehicle roll protective frame and cab enclosure that is rugged and effective for operator protection and provides environmental comfort for the operator.

In accordance with the present invention, there is provided a roll protective structure that is tiltably secured to a tractor or the like. The roll protective structure includes an operator platform including a seat support structure. The operator platform also serves to enclose the vehicle console elements and the like disposed below the platform. The roll protective structure and operator platform are enclosed by means of panels detachably secured thereto and tiltable with the operator station.

BRIEF DESCRIPTION OF THE DRAWINGS

The above and other objects and advantages of the present invention will become apparent from the following description when read in conjunction with the accompanying drawings, wherein:

FIG. 4 is an isometric view of a roll-over protective structure and cab arrangement constructed in accordance with the present invention.

DETAILED DESCRIPTION OF PREFERRED EMBODIMENT

Figure 1:
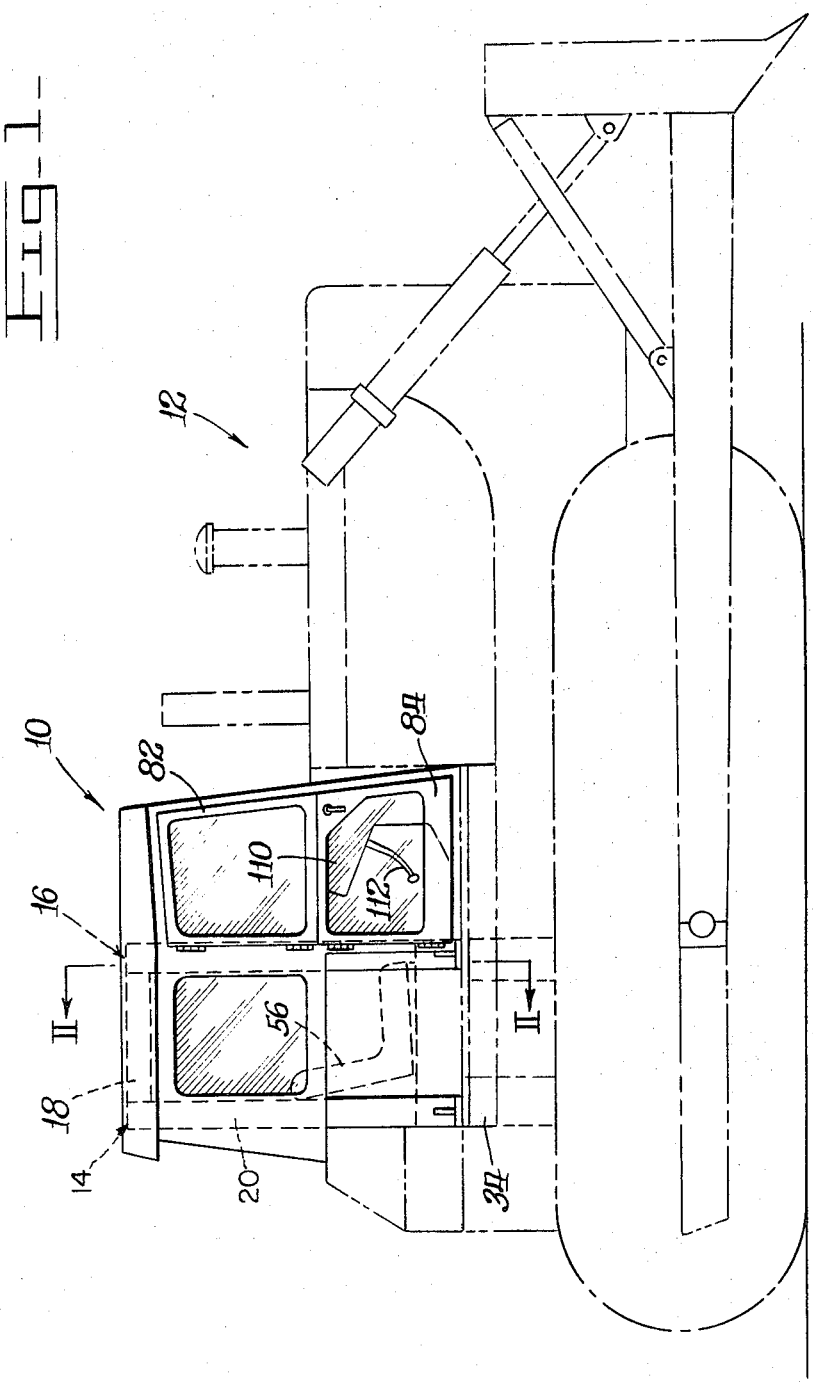
FIG. 1 is a side elevational view of a preferred embodiment of the present invention shown in position on a tractor shown in phantom.

Referring now to the drawings and particularly to FIG. 1, there is illustrated the roll-over protective structure and cab arrangement generally designated by the numeral 10 shown in position upon a track-type tractor designated by the numeral 12 and illustrated in phantom.

The roll protective structure comprises a rear frame 14 and a front frame 16 longitudinally spaced forward of the rear frame and rigidly connected thereto by means of a pair of structural members 18 at the top thereof. The rear structural member 14 comprises a pair of generally vertically extending structural or leg members 20 laterally spaced and rigidly interconnected at the top by means of a structural cross member 22. The front structural member 16 comprises a similar pair of substantially vertically extending structural or leg members 24 rigidly connected at the top by means of a cross member 26. The legs 20 and 24 are slanted inward at the top to increase the lateral structural strength or rigidity of the frame. These structural members are constructed of box-like tubular members having a substantially rectangular cross section. Suitable reinforcing means 28 reinforces the joint between the vertical structural or leg members 20 and 24 and the respective cross members 22 and 26.

Figure 2:
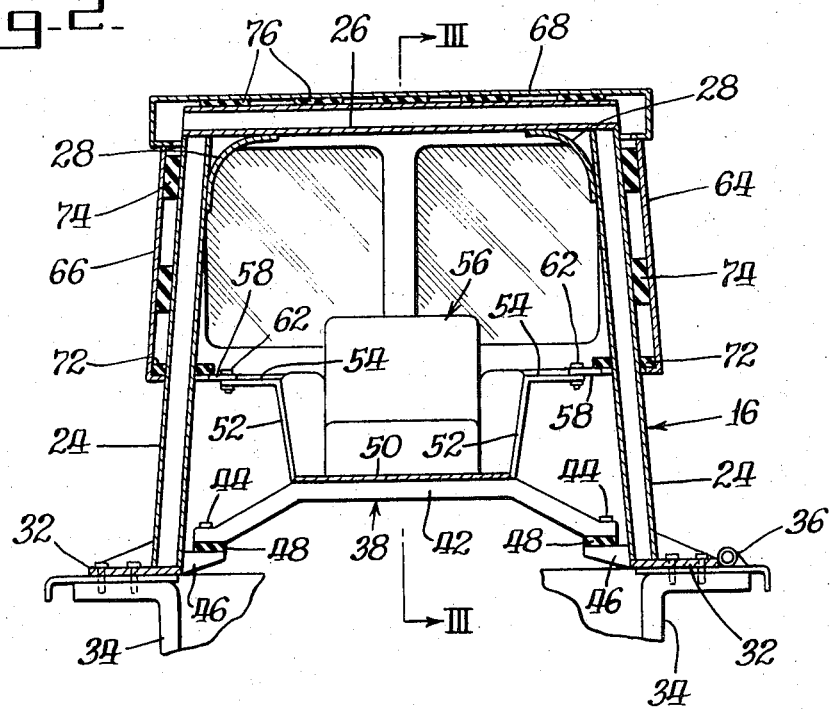
FIG. 2 is a sectional view taken generally along lines II—II of FIG. 1.

The lower ends of the legs 20 and 24 are provided with suitable bracket means or brackets 30 and 32 for securing the protective structure to the frame 34 of the tractor. The brackets on one side of the frame, as shown in FIG. 4, may be secured such as by bolts, as shown, to the frame 34. The brackets on the opposite side of this structure, as best seen in FIG. 2, may be provided with a hinge portion 36 so as to be pivotally secured to that side of the vehicle frame. This permits the entire frame and cab assembly to be either tilted to one side upon removal of the bolts from the opposite side or completely detached to provide ready access to portions of the vehicle lying underneath the operator station or platform.

The roll protective structure is further strengthened by a cross frame or member 38 which comprises fore and aft cross beams 40 and 42 tied together at both ends to provide additional strength. The frame is secured at each side, in any suitable manner such as by bolts 44, to suitable support brackets or frame members 46 which also serve to extend between and secure together the fore and aft legs 20 and 24. Suitable resilient or damping means such as rubber or the like serve as isolation or vibration dampening mounts 48 between the cross frame 38 and bracket members 46.

The cross frame 38 also extends upward to serve as a stable support or platform for supporting a seat platform. The seat platform comprises a seat support or platform member 50 resting across frame 38 and including side walls 52 and shelf area 54 surrounding a seat 56.

The seat's shelf area 54 is secured at each side to brackets 58 and at the rear to a flange 60 by suitable means such as bolts 62. This seat platform and a floorboard to be described comprise what could be referred to generally as an operator station platform.

The brackets or flanges 58 extend inward from side panels 64 and 66 which extend downward from a roof or top 68, and serve to enclose the side area of the operator platform. Flange 60 extends inward from rear panel 70 which likewise extends downward from the roof or top 68 to enclose the rear area of the operator station to define a cab or enclosure for the operator compartment. The side panels are provided with suitable isolation means comprising blocks or strips 72 and 74 of rubber or the like compressed between the respective panel and legs 20 and 24. Similar isolation means or blocks 76 extend between the roof 68 and the upper cross beams or members 22 and 26 to isolate the roof from vibration, etc., of the structural members. The side and rear panels are preferably hung or secured from the roof section 68 in a manner to be detachable therefrom, so that when or if desirable, the entire enclosure structure may be removed, leaving the top intact and a completely opened operator platform or area. The side panels 64, 66 and the rear panel 70 are all provided with suitable transparent sections of glass or the like to provide all-around visibility for the machine operator.

Figure 3:
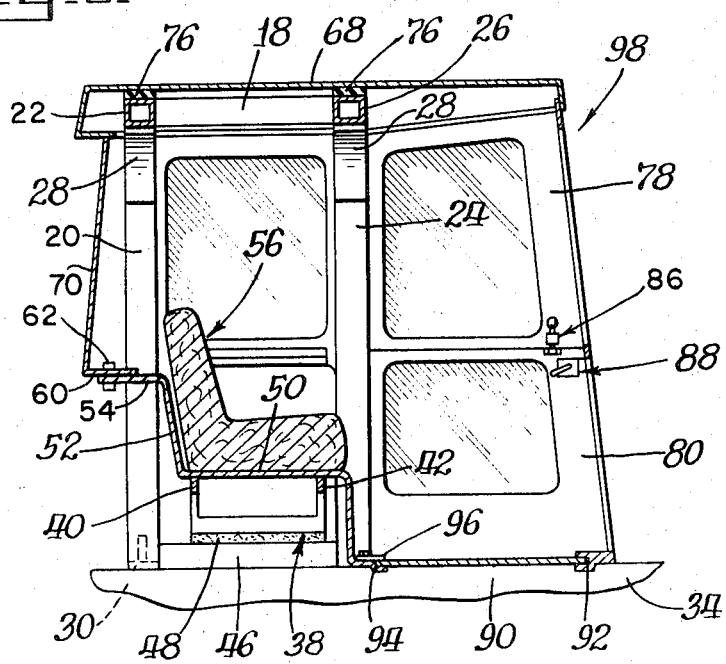
FIG. 3 is a sectional view generally along lines III—III as in FIG. 2.

A pair of doors, each comprising upper and lower section 78 and 80, 82 and 84, respectively, are pivotally connected in a suitable manner to the respective side panels or other support structure at each side of the operator compartment. Each upper section is provided with a suitable latch 86 as shown in FIG. 3 so that it may be unlatched and swung backward independently of each lower section of the door. A suitable latch 88 secured to the lower section 80 of the door, is operative to latch the respective door in the closed position.

The operator platform further includes a removable floor plate 90 which extends at its forward edge into a slot 92 formed in vehicle frame portion 34 and received at the backward edge in a recess 94 formed in the lower front portion of seat support platform 50. Suitable tabs 96 are provided to keep the floor plate in position.

This floor plate is removed prior to tilting the cab and roll frame to provide access to portions of the vehicle below the operator station which is not immediately accessible by means of removal of the plate 90.

A front panel 98, as best seen in FIG. 4, includes a frame 100 surrounding and supporting an upper front windshield 102 and side windshields 104 and 106. The front panel defines an open portion 108 which extends around the main control console as best seen in FIG. 1. The main control console 110 is supported on the fire wall at the rear of the engine.

Thus, as seen in FIG. 1, the particular enclosure structure and platform is constructed to be used for tractors wherein the main tractor control or vehicle control console is arranged as indicated at 110. This console arrangement includes for example brake and/or decelerator pedals 112 depending from a panel back-to-back with the fire wall so that the cab and rollover protective structure may be tilted independent of the main vehicle control console. However, as best illustrated in FIG. 4, implement consoles 114 and 116 are located in the areas to the side of and immediately forward of the seat. Thus, with this construction, a minimum number of control linkages or the like must be removed in order that the protective structure may be tilted to provide complete access to vehicle controls and the like.

From the above description, it is seen that there is provided a roll protective structure for tractor vehicles that is constructed and arranged to be tilted away to provide complete access to vehicle components for complete maintenance and repair. The structure also accommodates panels to define an enclosed cab structure to provide improved operator comfort. This operator comfort and the like may be further enhanced by provision of air conditioning units indicated at 118 in FIG. 4.

While the present invention has been described and disclosed with respect to a single embodiment, it is to be understood that numerous changes and modifications may be made therein without departing from the spirit and scope of the present invention as defined in the appended claims.

What is claimed is:

1. A vehicle roll protective structure having an integrated operator platform comprising:
    a plurality of vertically extending structural members defining a forward member and a rearward member for each side of said structure;
    a plurality of structural cross members tying said vertically extending members together at the top thereof;
    a seat support platform comprising an unitary cross frame including forward and rearward cross members extending between and secured respectively to said forward and rearward vertically extending structural members at the bottom thereof and further including means defining a seat platform with side portions extending upward and secured to said vertically extending members at a position spaced upward from said bottom; and,
    said roll protective structure being pivotally mounted to a tractor frame.

2. The roll protective structure of claim 1 comprising means including sidewalls and a shelf surrounding said seat platform defining an operator station platform integrated therewith.

3. The roll protective structure of claim 2 wherein said operator station platform defines cover means covering control linkages and the like disposed below said platform.

4. The roll protective structure of claim 3 comprising a roof panel and a plurality of side panels, a rear panel, and a front panel, all operatively connected and depending from said roof panel operative to sealingly enclose said operator station platform.

5. The roll protective structure in accordance with claim 4 comprising an opening in said front panel to receive the vehicle control console whereby said entire roll protective structure and cab enclosure may be tilted to one side without interference from said control console.

6. The roll protective structure and cab enclosure of claim 5 wherein each of said side panels comprises a door pivotally connected thereto to swing about a substantially vertical axis.

7. The roll protective structure and cab enclosure of claim 6 wherein each of said doors comprises an upper door section and a lower door section; and wherein said upper door sections are swingable independent of said lower door sections.

8. The roll protective structure of claim 2 wherein said structural members are tubular with rectangular cross sections.

9. The roll protective structure of claim 8 wherein said vertically extending structural members are slanted inward at the top to increase the structural rigidity and strength of said protective structure.

* * * * *